3 Sheets. Sheet 1.
J. P. Manny.
Mower.
No. 3525. Reissued. June 29. 1869.
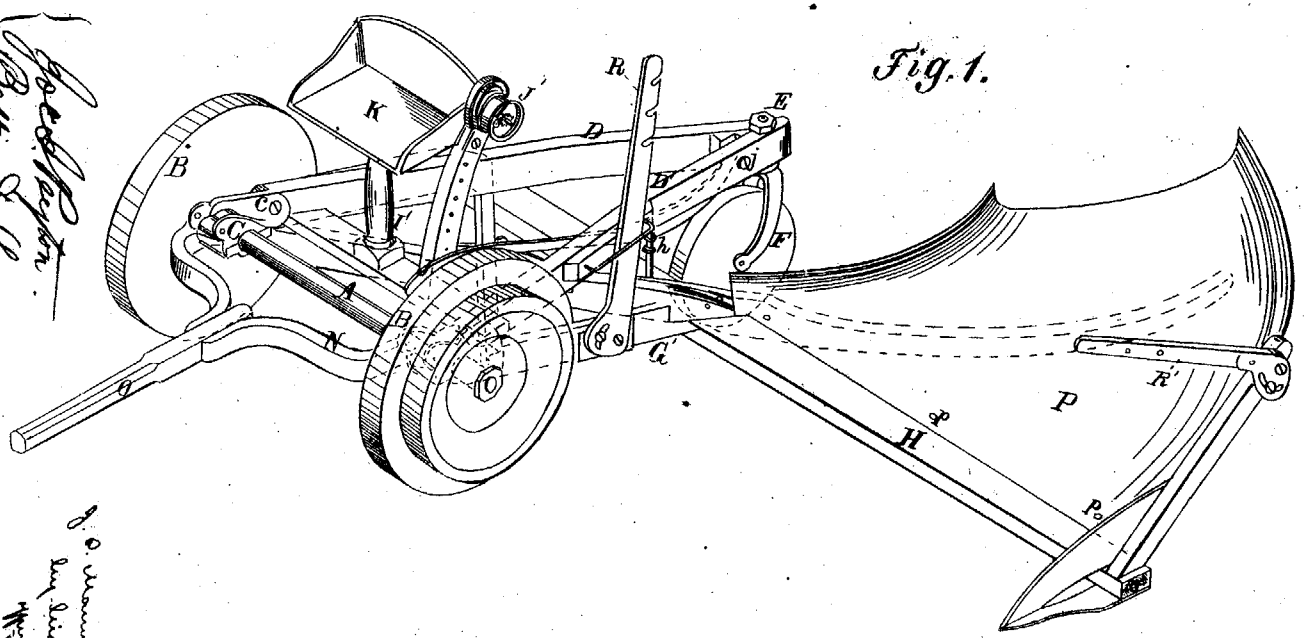
Witnesses: { Geo. A. Peyton. Battie De Long.
J. P. Manny
by his Attys
Wm. D. Baldwin 3. Sheets. Sheet. 2.
J. P. Manny.
Mower.
No. 3525.
Reissued. June. 29. 1869.
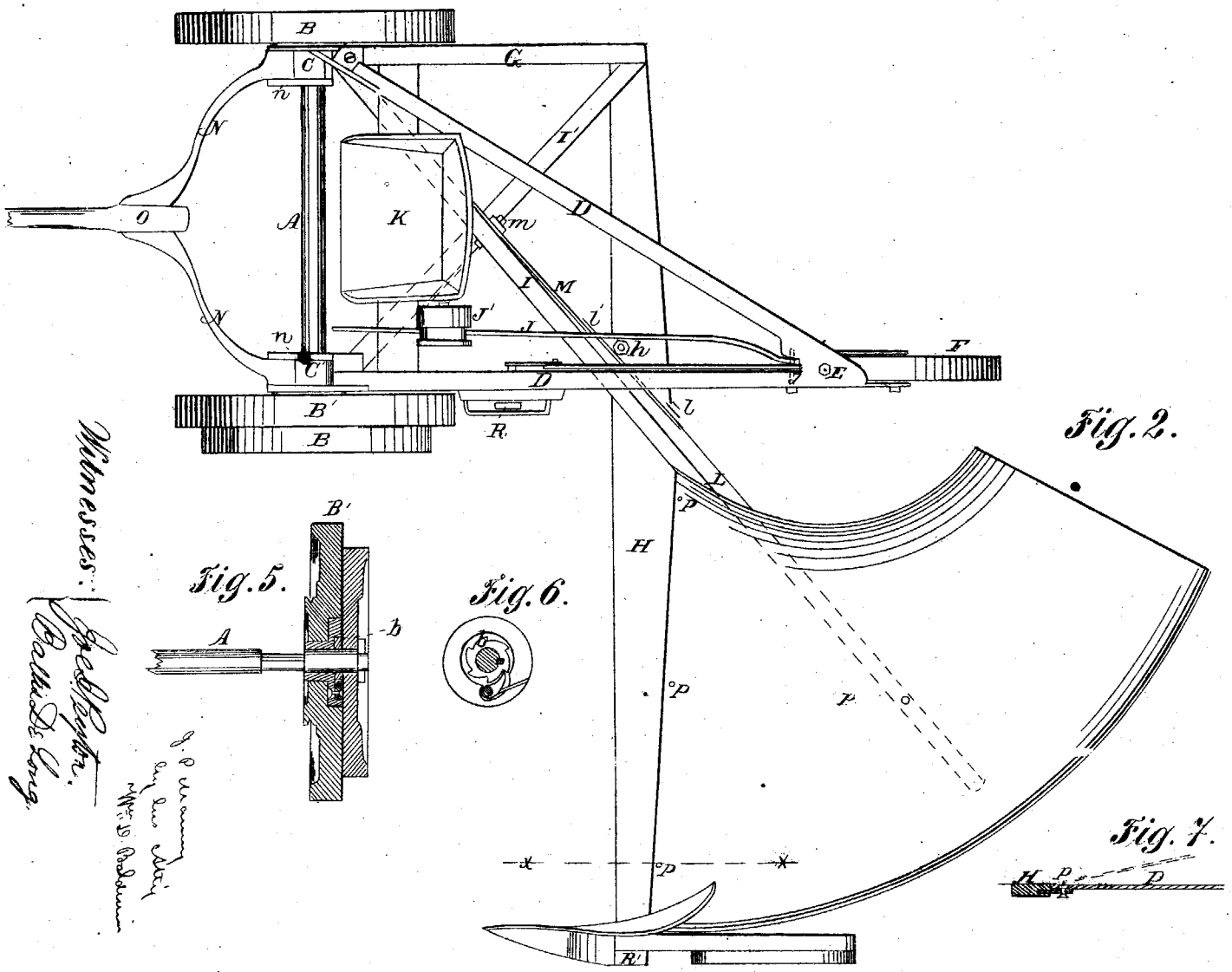
J. P. Manny
by his Atty
Wm. D. Baldwin
Witnesses: Joel Peyton.
Baltus De Long.

3. Sheets. Sheet 3
J. P. Manny.
Mower.
No. 3525.
Reissued June 29, 1869.
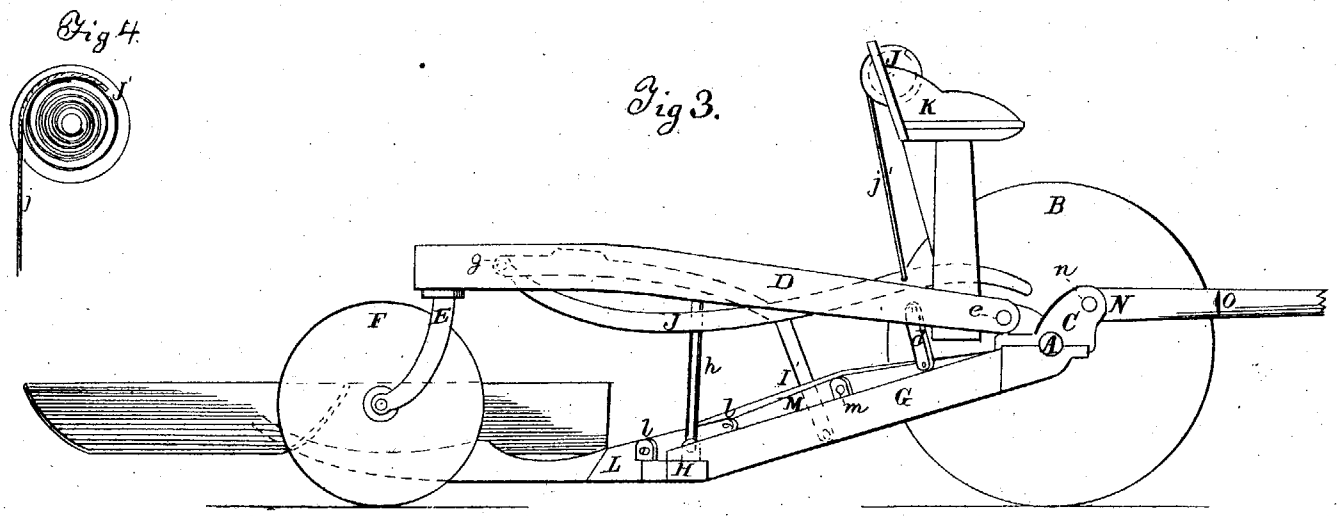
J. P. Manny
by his Atty
Wm. H. Baldwin
Witnesses { Jos. S. Payton.
Walter De Long.

UNITED STATES PATENT OFFICE.

JOHN P. MANNY, OF ROCKFORD, ILLINOIS.

IMPROVEMENT IN HARVESTERS.

Specification forming part of Letters Patent No. 17,779, dated July 14, 1857; reissue No. 3,525, dated June 29, 1869.

DIVISION B.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The improvements herein claimed consist, first, of the combination of a laterally-projecting finger-beam and a main frame, vibrating about the main axle, with a hinged supplementary frame, supported behind said axle on a caster-wheel; second, of the combination of two main wheels, a frame, connected with the axle of said wheels in front, and supported by a caster-wheel in rear, and a vibrating frame, carrying a laterally-projecting finger-beam, suspended from the caster-frame by flexible connections.

The object of the next branch of the invention is to enable the driver to raise or lower the finger-beam, or to carry it at any desired elevation above the ground; and the improvement consists, third, of the combination, substantially as hereinafter set forth, in a harvester, of two main wheels, a frame, vibrating about the main axle, and carrying a laterally-projecting finger-beam, with a frame, connected with the axle, supported at its rear end by a caster-wheel, and carrying devices for raising or lowering the finger-beam; fourth, of the combination of two main wheels, a vibrating main frame, and a laterally-projecting finger-beam, with lifting devices and a driver's seat, mounted on a vibrating frame behind the axle.

The object of the next part of the invention is to prevent the finger-beam from bearing too heavily on the ground; and the improvement consists, fifth, of the combination of a laterally-projecting finger-beam, a frame, vibrating about the main axle, a supplementary frame, supported by a caster-wheel, and a tension-spring on the stationary frame, with a lifting-chain connected with the vibrating frame; sixth, of the combination, in a two-wheeled rear-cut harvester, of a tongue, a frame carrying a laterally-projecting finger-beam, and a frame carrying lifting devices, and a conductor's seat, the tongue and frames each being independently pivoted, and moving independently of each other.

In the accompanying drawings, which make part of this specification, Figure 1 represents a view in perspective of so much of a harvester, embracing my invention, as is necessary to illustrate the improvements herein claimed. Fig. 2 represents a plan or top view of the same; Fig. 3, a view in elevation of the same, as seen from the stubble side, with the outer wheel removed; Fig. 4, a vertical section through a spring-drum, which is used for taking up a portion of the weight of the finger-beam, to prevent it from dragging too heavily on the ground; Fig. 5, a vertical section through one of the driving-wheels; Fig. 6, a section showing one of the backing-ratchets; and Fig. 7, a vertical section through the finger-beam and platform at the line *x x* of Fig. 2.

An axle, A, supported on wheels B B′, turns freely in boxes or bearings C C′, to each of which one end of a piece, D D′, is respectively secured. The wheels also turn loosely on the axle, with which they are connected by suitable backing-ratchets *b*, Fig. 6. The frame-pieces D D′ unite at their rear ends, and are supported by a caster-wheel, F, turning freely on its pivot or spindle E. Longitudinal side pieces G G′ are connected to the lower rear parts of the boxes C C′ in front, and are attached in rear to a finger-beam, H, projecting laterally beyond the wheels and frame. Diagonal braces I I′ pass from corner to corner of the quadrangular frame, formed by the main axle, the projecting extension of the finger-beam, and the side pieces G G′, and brace these parts firmly, while allowing them to vibrate or be adjusted around the axle A, as hereinafter described. A lever, J, is pivoted at *j* to the frame-piece D′, and extends to a point near the conductor's seat K, likewise mounted on the frame D D′, so that the driver can readily operate the lever to raise or lower the finger-beam, which is suspended from the lever by a rod, *h*, which works loosely in an eye on the lever to allow the finger-beam to rise without moving the lever. The tongue O is connected to hounds M, hinged to the boxes C C′ at *n*.

When these machines are used for mowing, the finger-beam is lowered so as to move over, but in contact with, the ground, in order to cut close; but the friction produced by the dragging of the finger-beam is detrimental, by increasing the draft. This difficulty I obviate by mounting a spring-drum, J′, on a standard, supported on the frame D D′, and connecting it by a cord or chain, *j*′, with the lifting-lever J, from which the finger-beam is suspended. One end of a coiled spring is fastened to the axis, and the other to the periphery of the drum, which is also provided with a ratchet and pawl, so that the spring may be wound up to and held at any desired degree of tension. The tension of the spring regulates the lifting power applied to the lever J, and thus relieves the pressure of the finger-beam upon the ground, while allowing the crop to be closely cut.

For reaping, I attach a platform to the finger-beam by hinges *p*, Fig. 7; but in raising or lowering this platform I desire it always to retain the same horizontal position, or, in other words, to be raised and lowered in parallel lines, front and rear, which it would not do with the devices above described alone. To effect this object, therefore, I use a long lever or supporting-beam, L, which extends far under the platform, as shown in dotted lines in Fig. 2, and its outer end is fastened to the platform. This beam L is hinged to the finger-beam at *l*, and its front end is pivoted at *l*′ to one end of a lever, M, which has its fulcrum at *m*, on the diagonal brace I, while its front end is connected by a link, *d*, with the frame D D′. The result of this arrangement is, that the supporting-piece L depresses the rear end of the platform as the finger-beam is raised by the lever J, and vice versa, the connection between the frame D D′ and the supporting-piece L forming a compound lever to effect this purpose, and thus both the front and rear of the platform are kept in a horizontal position while they are raised or lowered to any desired cutting-height. The reel-arms or standards R R′ are respectively mounted on and vibrate with the divider and the frame D.

The operation of the machine will readily be understood from the foregoing description. The team is harnessed to the tongue in the usual well-known way. The tongue being pivoted to the boxes, near the main axle, is free to vibrate up and down around said pivots, without affecting the movements of the other parts of the machine. The frame D D′ is, in like manner, pivoted to the boxes near the axle, and is also free to vibrate up and down around said pivots. The frame G G′ is likewise connected with the boxes in which the main axle turns, and is free to vibrate up and down around said axle, to allow the finger-beam to conform to the undulations of the ground over which it slides when mowing. As the frame G G′ is suspended by a link, *h*, from the lever J on the frame D D′, the driver can raise or lower the finger-beam at pleasure, or hold it at any desired elevation. When reaping, he can, in like manner, raise and lower the platform, at the same time keeping it horizontal by means of the lever M and its linked connections with the frame D D′. As the driver's seat is mounted on the frame D D′, the finger-beam and tongue can both vibrate up and down without rocking the seat back and forth on the axle.

What I claim herein as my invention, and desire to secure by Letters Patent, is—

1. The combination, substantially as set forth, of a finger-beam, projecting laterally from a frame vibrating about the main axle, with a hinged supplementary frame supported behind said axle by a caster-wheel.

2. The combination, substantially as set forth, of two main wheels, a frame pivoted near the axle of said wheels in front, and supported by a caster-wheel in rear, and a vibrating frame, carrying a laterally-projecting finger-beam suspended from the caster-frame by flexible connections.

3. The combination, substantially as set forth, of two main wheels, a main frame vibrating about the main axle and carrying a laterally-projecting finger-beam, with a frame pivoted near the axle, supported at its rear end by a caster-wheel, and carrying devices for raising and lowering the finger-beam.

4. The combination, substantially as set forth, of two main wheels, a vibrating main frame, and a laterally-projecting finger-beam, with lifting devices, and a driver's seat mounted on a vibrating frame behind the axle.

5. The combination of a laterally-projecting finger-beam, a frame vibrating about the main axle, a supplementary frame supported by a caster-wheel, a tension-spring, and lifting-cord, the combination being and operating substantially as set forth.

6. The combination, substantially as set forth, in a two-wheeled rear-cut harvester, of a tongue, a frame carrying a laterally-projecting finger-beam, and a frame carrying lifting devices and a conductor's seat, the tongue and frames each being independently hinged near the main axle and moving independently of each other.

JOHN P. MANNY.

Witnesses:
THOMAS W. COLE,
SILAS G. TYLER.